United States Patent
Yu

(10) Patent No.: US 8,468,186 B2
(45) Date of Patent: Jun. 18, 2013

(54) COMBINATION OF VALUES FROM A PSEUDO-RANDOM SOURCE

(75) Inventor: Meng-Day Yu, Fremont, CA (US)

(73) Assignee: Verayo, Inc., San Jose, CA (US)

( * ) Notice: Subject to any disclaimer, the term of this patent is extended or adjusted under 35 U.S.C. 154(b) by 476 days.

(21) Appl. No.: 12/850,849

(22) Filed: Aug. 5, 2010

(65) Prior Publication Data

US 2011/0066670 A1  Mar. 17, 2011

Related U.S. Application Data

(60) Provisional application No. 61/231,417, filed on Aug. 5, 2009.

(51) Int. Cl.
*G06F 7/58* (2006.01)

(52) U.S. Cl.
USPC ............................................................ 708/250

(58) Field of Classification Search
None
See application file for complete search history.

(56) References Cited

U.S. PATENT DOCUMENTS

| | | | |
|---|---|---|---|
| 4,985,614 A | 1/1991 | Pease |
| 5,177,352 A | 1/1993 | Carson |
| 5,180,901 A | 1/1993 | Hiramatsu |
| 5,204,902 A | 4/1993 | Reeds |
| 5,247,577 A | 9/1993 | Bailey |
| 5,375,169 A | 12/1994 | Seheidt |
| 5,388,157 A | 2/1995 | Austin |
| 5,528,231 A | 6/1996 | Patarin |

(Continued)

FOREIGN PATENT DOCUMENTS

| | | |
|---|---|---|
| CA | 2344429 | 3/2000 |
| DE | 19843424 | 3/2000 |
| EP | 1100058 | 5/2001 |
| EP | 1341214 | 9/2003 |

OTHER PUBLICATIONS

Arazi, B. "Interleaving Security and Efficiency Consiederations in the Design of Inexpensive IC Cards". IEEE Proceedings on Computers and Digital Techniques. vol. 141, Issue 5, Publ Date Sep. 1994, pp. 265-270.

(Continued)

*Primary Examiner* — David H Malzahn
(74) *Attorney, Agent, or Firm* — Occhiuti Rohlicek & Tsao LLP

(57) ABSTRACT

Values generated by at least one pseudo-random source (PRS) are recombined to form one or more recombined values. The method involves using analog, digital, or hybrid manipulation techniques to transform characteristics of PRS, including but not limited to statistical characteristics, and input/output characteristics. In some examples, the recombination method provides a way to de-bias output bits from PRS without appreciable increase in self noise. In some examples, the recombined result passes NIST's Statistical Tests for Randomness even if underlying PRS natively does not. In some examples, the recombination method provides a way to make a PRS challengeable, even if the underlying PRS is not natively challengeable. In some examples, recombination is used to allow single PRS to have multiple outputs, and in some cases multi-dimensional (orthogonal) outputs. In some examples, a multi-modal system is created via recombination using multiple PRS. In some examples, post recombined result exhibit super error characteristics (prior to application of any error correction codes) compared to native PRS output. In some examples, the recombined values are applied to security applications, for instance authentication and/or cryptographic functions, which may provide improved characteristics (e.g., cryptographic strength) in view of a de-biased output which in some examples also passes NIST's Statistical Tests.

21 Claims, 6 Drawing Sheets

U.S. PATENT DOCUMENTS

| | | | |
|---|---|---|---|
| 5,768,382 | A | 6/1998 | Schneier |
| 5,818,738 | A | 10/1998 | Effing |
| 5,862,094 | A | 1/1999 | Kawabata |
| 5,883,956 | A | 3/1999 | Le |
| 5,920,628 | A | 7/1999 | Indeck |
| 5,963,104 | A | 10/1999 | Buer |
| 6,026,293 | A | 2/2000 | Osborn |
| 6,161,213 | A | 12/2000 | Lofstrom |
| 6,233,339 | B1 | 5/2001 | Kawano |
| 6,246,254 | B1 | 6/2001 | Choukalos |
| 6,289,292 | B1 | 9/2001 | Charlton |
| 6,289,453 | B1 | 9/2001 | Walker |
| 6,289,455 | B1 | 9/2001 | Kocher |
| 6,301,695 | B1 | 10/2001 | Burnham |
| 6,305,005 | B1 | 10/2001 | Burnham |
| 6,324,676 | B1 | 11/2001 | Burnham |
| 6,363,485 | B1 | 3/2002 | Adams |
| 6,386,456 | B1 | 5/2002 | Chen |
| 6,402,028 | B1 | 6/2002 | Graham, Jr. |
| 6,529,793 | B1 | 3/2003 | Beffa |
| 6,535,016 | B2 | 3/2003 | Choukalos |
| 6,848,049 | B1 | 1/2005 | Tailliet |
| 7,568,113 | B2 | 7/2009 | Linnartz |
| 7,577,850 | B2 | 8/2009 | Barr |
| 7,667,572 | B2 * | 2/2010 | Husak et al. ............... 340/10.1 |
| 8,244,909 | B1 * | 8/2012 | Hanson et al. ............... 709/238 |
| 2001/0032318 | A1 | 10/2001 | Yip |
| 2001/0033012 | A1 | 10/2001 | Kommerling |
| 2002/0065574 | A1 | 5/2002 | Nakada |
| 2002/0095594 | A1 | 7/2002 | Dellmo |
| 2002/0106087 | A1 | 8/2002 | Lotspiech |
| 2002/0107798 | A1 | 8/2002 | Hameau |
| 2002/0128983 | A1 | 9/2002 | Wrona |
| 2002/0150252 | A1 | 10/2002 | Wong |
| 2002/0188857 | A1 | 12/2002 | Orlando |
| 2002/0199110 | A1 | 12/2002 | Kean |
| 2003/0204731 | A1 | 10/2003 | Pochuev |
| 2003/0204743 | A1 | 10/2003 | Devadas |
| 2003/0219121 | A1 | 11/2003 | Van Someren |
| 2004/0136529 | A1 | 7/2004 | Rhelimi et al. |
| 2004/0148509 | A1 | 7/2004 | Wu |
| 2005/0051351 | A1 | 3/2005 | De Jongh |
| 2007/0038871 | A1 | 2/2007 | Kahlman |
| 2007/0039046 | A1 | 2/2007 | Van Dijk |
| 2007/0044139 | A1 | 2/2007 | Tuyls |
| 2007/0180009 | A1 * | 8/2007 | Gutnik ............... 708/250 |
| 2008/0044027 | A1 | 2/2008 | Van Dijk |
| 2008/0059809 | A1 | 3/2008 | Van Dijk |
| 2008/0106605 | A1 | 5/2008 | Schrijen |
| 2009/0292921 | A1 | 11/2009 | Braun et al. |
| 2010/0073147 | A1 | 3/2010 | Guajardo Merchan et al. |
| 2011/0066670 | A1 * | 3/2011 | Yu ............... 708/252 |

OTHER PUBLICATIONS

Hon-Sum Wong et al, "Three-Dimensional "Atomistic" Simulation of Discrete Random Dopant Distribution Effects in Sub-0.1μm MOSFET's".IEDM, 29(2):705-708, 1993.

Bennet Yee, "Using Secure Coprocessors," Carnegie Mellon University, Pittsburg, PA. May 1994.

Ross Anderson et al. "Low Cost Attacks on Tamper Resistant Devices" Cambridge University, Cambridge, England. Apr. 1997.

Milor et al., "Logic Product Speed Evaluation and Forecasting During the early phases of Process Technology Development Using Ring Oscillator Data," 2nd International Work Statistical Metrology, 1997 pp. 20-23.

Ross Anderson et al. "Tamper Resistance—a Cautionary Note". Cambridge University, Cambridge, England. Nov. 1996.

Tuyis et al., "Information-Theoretic Security Analysis of Physical Uncloneable Functions," Proceedings ISIT 2004 (Chicago), p. 141.

Omura, J.K., Novel Applications of Cryptogrtaphy in Digital Communications, IEEE Comm Mag., May 1990, pp. 21-29.

Srinivas Devadas et al., "Synthesis of Robust Delay-Fault Testable Circuits: Practice" Massachusetts Institute of Technology, Cambridge, MA Mar. 1992.

Srinivas Devadas et al., "Synthesis of Robust Delay-Fault Testable Circuits: Theory" Massachusetts Institute of Technology, Cambridge, MA Jan. 1992.

Sean W. Smith et al. "Building a High-Performance, Programmable Secure Coprocessor". IBM T.J. Watson Research Center, Yorktown Heights, NY. Oct. 16, 1998.

Duane S Boning et al., "Models of Process Variations in Device and Interconnect," Massachusetts Institute of Technology, Cambridge, MA Aug. 23, 1999.

Ravikanth, Pappu Srinivasa . "Physical One-Way Functions". Massachusetts Institute of Technology, Cambridge, MA. Mar. 2001.

Blaise Gassend et al., "Silicon Physical Unknown Functions and Secure Smartcards." Massachusetts Institute of Technology, Cambridge, MA May 13, 2002.

Blaise Gassend et al. "Controlled Physical Unknown Functions Applications to Secure Smartcards and Certified Execution," Massachusetts Institute of Technology, Cambridge, Jun. 10, 2002.

Blaise Gassend et al., "Silicon Physical Random Functions", MIT, Proceedings of the Computer and Communication Security Conference, Nov. 2002, Memo 456.

Blaise Gassend, "Physical Random Functions," Massachusetts Institute of Technology, Cambridge, MA Feb. 2003.

Gassend, B.L.P., Physical Random Functions; Thesis, Thesis at the Massachusetts Institute of Technology. pp. 1-89 (Feb. 1, 2003) XP002316843.

Daihyun Lim, "Extracting Secret Keys from Integrated Circuits" Massachusetts Institute of Technology, Cambridge, MA, May 2004.

Lee et al., "A Technique to Build a Secret Key in Integrated Circuits for Identification and Authentication Applications," Massachusetts Institute of Technology (CSAIL) Jun. 2004.

Xilinx (Ralf Krueger) "Using High Security Features in Virtex-II Series FPGAs" www.xilinx.com, [printed Jul. 8, 2004].

Ranasinghe et al., "Secutiry and Provacy Solutions for Low-Cost RFID Systems." (2004).

Tuyls, Pim and Lejla Batina, "RFID-Tags for Anti-Counterfeiting," Topics in Crytography, vol. 3860/2006, No. LNCS3860, (Feb. 13, 2005) XP002532233.

Tuyls et al., "Security Analysis of Physical Uncloneable Functions," Proc. 9th Conf. on Financial Cryptography and Data Security , Mar. 2005, LNCS 3570, pp. 141-155.

G. Edward Suh, et al., "Design and Implementation of the AEGIS Single-Chip Secure Processor Using Physical Random Functions," In the proceedings of the 32nd International Symposium on Computer Architecture, Madison, Wisconsin, Architecture, Jun. 2005, (Memo-483).

Skoric et al., "Robust Key Extraction from Physical Uncloneable Functions," Proc. Applied Cryptography and Network Security 2005, LNCS 3531, pp. 407-422.

Ulrich Ruhrmair "SIMPL Systems: On a Public Key Variant of Physical Unclonable Functions" Cryptology ePrint Archive, Report 2009/255.

* cited by examiner

COMBINATION OF VALUES FROM A PSEUDO-RANDOM SOURCE

CROSS-REFERENCE TO RELATED APPLICATION

This application claims the benefit of U.S. Provisional Application No. 61/231,417, filed on Aug. 5, 2009, which is incorporated herein by reference.

BACKGROUND

This invention relates to combination of values generated by one or more pseudo-random sources (PRS).

A pseudo-random value, or set of values, can be used, for example, for a applications in which the pseudo-random value can be regenerated, but the value cannot be predicted, or such prediction would be very difficult or time consuming. In some examples, the pseudo-random value depends on an input value, often referred to as a "challenge" value. In some examples, the pseudo-random values comprise bits that are generated by circuitry that implements a function depend on device-specific characteristics, for example, based on device-to-device fabrication variation among a set of devices that are fabricated in a common manner, for example, according to the same semiconductor masks and fabrication conditions. Some examples of such functions have been referred to as Physical Unclonable Functions (PUFs). Examples of the device-specific characteristics include time-delay along electrical signal paths (e.g., through logic gates and conductive traces), and voltage thresholds of active semiconductor devices. In a number of previous approaches, the device specific quantities are binary, for example, based on a comparison of pairs of underlying device-specific characteristics. For example, US Pat. Pub. 2003/0204743A1, titled "Authentication of Integrated Circuits," describes an approach in which a device-specific bit is generated according to the relative delay along two delay paths. As another example, US Pat. Pub. 2007/0250938A1, titled "Signal Generator Based Device Security," describes an approach in oscillation frequencies are compared to determine device-specific bits.

Statistical properties of the generated pseudo-random values can affect their suitability for certain applications. For instance, statistical bias of the values may affect the strength of authentication and/or cryptographic techniques that make use of the values. Measures of a set of values include the National Institute of Standards and Technology (NIST) Statistical Test Suite for Randomness, which includes tests that measure statistical bias.

SUMMARY

In one aspect, in general, values generated by at least one pseudo-random source (PRS) are combined to form one or more combined values. The method involves using analog, digital, or hybrid manipulation techniques to transform characteristics of PRS, including but not limited to statistical characteristics, and input/output characteristics. In some examples, the recombination method provides a way to de-bias output bits from PRS without appreciable increase in self noise. In some examples, the recombined result passes NIST's Statistical Tests for Randomness even if underlying PRS natively does not. In some examples, the recombination method provides a way to make a PRS challengeable, even if the underlying PRS is not natively challengeable.

In another aspect, in general, values generated by a pseudo-random source (PRS) are combined to form one or more combined values. In some examples, the recombination depends on a challenge value. In some examples, the recombined values are applied to security applications, for instance authentication and/or cryptographic functions, which may provide improved characteristics (e.g., cryptographic strength) in view of a de-biased output that in some examples also passes NIST's Statistical Tests for Randomness.

In some examples, the PRS depends of one or more of biometric readings, measurements of physical characteristics such as paint splotch patterns, speckle patterns, optical or magnetic readings, piece of paper or fabric, device-specific signatures from an integrated circuit, each of which can be modeled as a direct, or possibly noisy, observation of a pseudo-random source.

In some examples, the PRS outputs real values in the sense that the output is more than a single hard bit (polarity). In some examples, the PRS may output values that are only a single bit and (optionally) multiple reading are taken to synthesize a "real" value. In some examples, other means can be used to synthesize "real" values from a PRS whose output values are a single bit. The real value may take the form of confidence/magnitude information Values generated may be recombined using digital and/or analog techniques to produce certain desired properties in the system.

In some examples, the recombination approach may include making system fully challengeable, for instance, to generate multiple signatures through PRS recombination or reuse, thus reducing size of total PRS present, and making output of system be a real-valued output containing both polarity and confidence information. In some examples, only a single signature or key is required, and recombination can be used to reduce total PRS area by applying fixed challenge schedule to a recombination function that operates on an PRS area that would otherwise need to be larger (to generate the same size signature of key) if recombination were not applied.

In some examples, the recombination function and the PRS result in output bits that are unbiased by construction and pass NIST's Statistical Test Suite for Randomness. The recombination function, or in some cases more than one recombination function, can operate on an entire PRS at once (entire PRS treated as a single region), or operate on a region of PRS, with each region (possibly overlapping) using same or different recombination functions. The recombination output of each region can be also real valued (or hard binary value) and mixed with operations from different regions.

In various examples, challenge values are fixed, or non-fixed, and can determine parameters of each of recombination function, which recombination functions are used, and whether results are recombined again (possibly many times) before final real-valued output.

Recombination functions can be linear or non-linear. In some examples, the recombination approach offers a method to de-bias physical pseudo-random outputs that occur in nature without appreciable increase in self noise, which affects ability of authenticate or to error correct repeat readings into bit-exact values.

In some examples, the PRS forms an "entropy pool" with individual PRS components that are recombined with various functions, based on a challenge input, producing real-valued output whose bit polarity can be made random based on standard (NIST) tests. Entropy pool (PRS) and processing engine can be located in same entity (e.g., the same device) or in different entities.

In another aspect, in general, a device includes an input for accepting a challenge value. The device also includes a pseudo-random source configurable to provide a repeatably measurable characteristics, and includes a recombination module coupled to the input for accepting the challenge and to the pseudo-random source and responsive to the value. This module is for recombining the measurements according to a recombination function to form a recombined value. The device also has an output for providing the recombined value.

Aspect may include one or more of the following features.

The pseudo-random source is configured to provide multiple-bit representations of the measurable characteristics.

The recombination module is configured to form successive combined values, each recombined value being formed according to recombined result from PRS, using a different instantaneous challenge value. In a simple example, entire PRS is treated as a single region and one recombination function is used. In other example, a single recombination function can operate on multiple PRS and recombine values from multiple PRS, using, for example, outputs from multiple PRS to produce a single recombined output value, and using different instantaneous challenge values to produce successive recombined output values. In another example, multiple recombination function (possibly orthogonal functions) can operate on a single PRS, treated as a single region.

In another example, multiple recombination function can each be assigned to a region in PRS, with regions disjoint or possibly partially or fully overlapping. In another example, multiple recombination function can operate on multiple PRS.

The input for accepting the challenge includes a sequence generator that accepts the (initial) challenge accepted at the input and deterministically generates a sequence of (instantaneous) challenge values. The recombination module is responsive to successive (instantaneous) challenge values in forming the successive recombined values. In some examples, the sequence generator comprises a linear feedback shift register.

The corresponding subsets for successive combined values are selected from disjoint pools of the measurable characteristics.

The recombination function is selected to provide statistically unbiased recombined values.

The pseudo-random source comprises a measurement module for measuring the measurable characteristics.

The device further includes an authentication component responsive to the recombined value, a cryptographic component responsive to the recombined value for generating a secret value, and/or an error correction module for determining and/or using error correction data for the recombined value.

In another aspect, in general, device-specific quantities are generated in a circuit to depend on device-specific characteristics such that the quantity is represented by more than a single bit, with the quantity representing a degree of comparison of devices-specific characteristics. In some examples, the degree of comparison corresponds to a probability of that a bit will be reproduced in subsequent re-generation of the quantities. In some examples, the degree corresponds to a measure of a difference or differences between measured device-specific characteristics.

In another aspect, in general, a number of separate device-specific quantities are recombined, for example, according to a challenge input that determines which and/or in what manner the quantities are recombined. The resulting quantity maintains its device-specific nature, and can be more difficult to predict (e.g., in a cloned device), for instance, through use of a large number of potential challenge inputs. In some examples, the recombination is performed using operations on binary (e.g., two's complement) numbers, for instance, using additive and subtractive operations.

Aspects may include one or more of the following features.

The quantities are generated according to a challenge, for example, according to a 64-bit challenge value.

Quantities represent a polarity and a degree of confidence of the quantity.

The circuit (or a portion of the circuit or device) is implemented in a Field Programmable Gate Array (FPGA) or in an Application Specific Integrated Circuit (ASIC). In some examples, the pseudo-random source may be implemented in a different manner than the recombination circuit, for example, with the pseudo-random source using dedicated circuitry and the recombination circuit using configurable gate arrays, analog techniques, or an instruction processor.

In another aspect, in general, recombination provides a way to make PRS output real valued bits, even if underlying PRS natively does not.

In another aspect, in general, the recombination methods provides a way to recombine results from multiple PRS. In some examples, recombination is used to extract multidimensional output or multiple outputs (not necessarily orthogonal to each other) from a single PRS, or in some examples multiple PRS. In some examples, recombination function is selected to increase effort required to model physical random source from observations of bit output of recombination function. In some examples, recombined values are applied to security applications, for instance authentication and/or cryptographic functions, which may provide improved characteristics (e.g., cryptographic strength from debiased out; challengeability to address replay attacks; real valued output for reduced error correction complexity, etc.).

In another aspect, a recombination method provides a means to de-bias output bits (specifically the "polarity" portion of PRS output value when value in multi-bit) from PRS without appreciable increase in self noise. In certain examples, recombined result passes NIST's Statistical Tests for Randomness even if underlying PRS natively does not.

In another aspect, a recombination method provides a way to make a PRS challengeable, even if underlying PRS is not natively challengeable. Challengeability allows extraction of more signature/keys without larger instance of PRS (more ring oscillators, larger paint splotch area). Alternatively, a single key or signature can be generated with a smaller instance of PRS using a fixed challenge schedule. In certain examples, challengeability is accomplished in such a way that recombined output bits passes NIST's Statistical Tests for Randomness, even if underlying PRS natively does not.

In another aspect, the recombination method provides a way to make a pseudo-random system, possibly noisy, that is both challengeable and whose outputs are real-valued (contains both polarity and confidence information). The generation of real-valued bits provides a means to reduce error correction code complexity. In certain examples, error correction code complexity can be reduced exponentially, due to availability of confidence information from recombined output to perform a form of "soft decision" error correction code decoding. In some examples, recombination operation itself serves as an error reduction mechanism. In certain examples, output bit (polarity) generated from recombined result passes NIST's Statistical Tests for Randomness, even if underlying PRS natively does not, even if underlying PRS is not natively challengeable.

In another aspect, recombination method provides a means to combine results from different forms of PRS (silicon-based PUF with biometric readings), for use, for example, in a multi-modal signature/key system.

Aspects may include on or more of the following advantages.

The polarities of a series of output values are unbiased without an appreciable increase in self-noise (does not appreciably increase ECC complexity or increase type 1/type 2 authentication errors). For at least some recombination functions and pseudo-random sources, a bitstream formed from the polarities can pass the National Institute of Standards and Technology (NIST) Statistical Test for Randomness Suite, resulting in more entropy per outputted bit.

In some examples, recombined output exhibit better error characteristics than the native PRS output. For example, for some additive recombination functions, borderline outputs (noisy 1s and 0s) contribute less to the recombined result than strong 1s and 0s, thus allowing recombined output to have better error characteristics. This reduces error correction requirements, and increases strength (reduced type 1/type 2 errors) of authentication systems where error correction is not used.

Some examples provide an advantage of forming a PRS that is challengeable (eliminating a linear increase in PRS area for multiple signatures/keys, or alternatively reducing PRS implementation area required to produce a single signature or key), and that outputs bias-neutral bits (thereby making it more difficult for an adversary to apply a brute-force attack for a particular signature/key), and in particular achieving the latter without increasing self-noise appreciably.

Examples of recombination methods allows the PRS, even a naturally biased PRS, to be effectively un-biased (as measured by NIST tests) by (logical/algorithmic) construction, making method highly applicable to Field Programmable Gate Array (FPGA) and standard cell ASIC or other technologies where custom-layout or other customization facilities are limited. For instance, the recombination method reduces PRS silicon area required to withstand replay attacks (more signatures/keys without linear increase in size of PRS circuit through use of challenge).

In another aspect, a recombination method reduces PRS silicon area for single key/single root master system through use of, for example, fixed challenge schedule. In another aspect, the recombination method reduces (in certain examples exponentially) error correction code complexity/silicon area due to availability of real-valued outputs that indicate confidence of 1s and 0s (polarity), as well as error reduction effects of certain classes of recombination functions, or combinations thereof.

Other features and advantages of the invention are apparent from the following description, and from the claims.

DESCRIPTION

Figure 1:
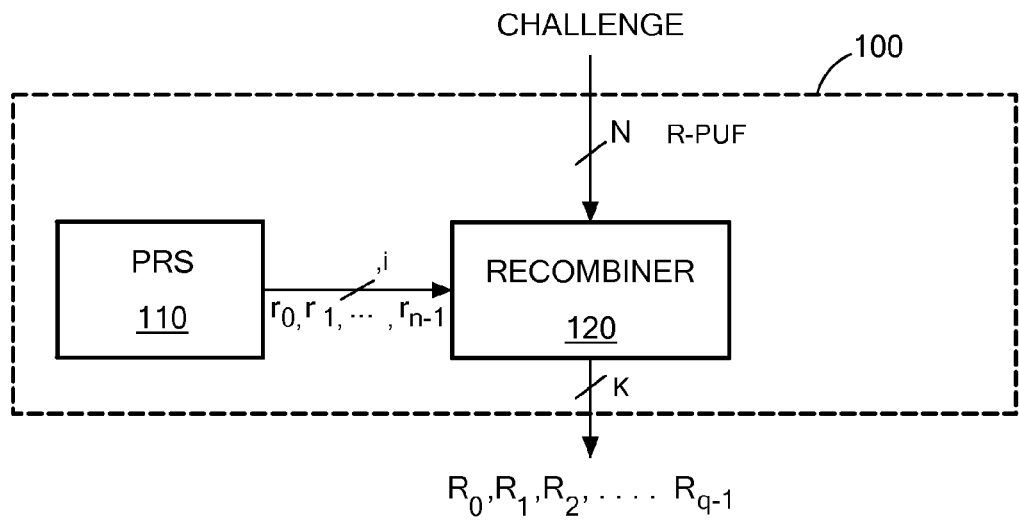
FIG. 1 is a block diagram of a recombination PUF (R-PUF)

Referring to FIG. 1, a system 100 accepts an N-bit challenge value (e.g., an N=64 bit value) and uses a series or other set of j-bit values $r_0, \ldots, r_{n-1}$ from a pseudo-random source (PRS) 110 to determine a series of $q \geq 1$ k-bit value quantities, $R_0, \ldots, R_{q-1}$ (e.g., a k=4 bit quantities) based on successive combinations of the PRS values. In this description, such a system (e.g., a circuit module or functionally equivalent implementation) is referred to for sake of discussion as a "recombination physical unclonable function", or "R-PUF," without intending to imply particular characteristics based on the name. Furthermore, in various examples as described below, the PRS may be integral (i.e., physically integrated and/or co-located) with the recombiner, or external (i.e., physically separated) from the recombiner, or partially implemented in a common device as the recombiner.

In general, the R-PUF makes use of the pseudo-random source (PRS) 110, which is a physical and/or logical element that can generate set (e.g., an indexed set, for instance, indexed by a place or time) of pseudo-random quantities $r_0, \ldots, r_{n-1}$, each possibly including a degree of "noise," for instance with a degree of additive random noise. That is the PRS can be considered as being capable of repeatedly regenerating the indexed set $r_0, \ldots, r_{n-1}$ to within a degree of similarly related to the "noise" in the values.

In some embodiments, the PRS 110 generates the values in a manner that is specific to a device in which it is implemented in the sense that it is impossible or very difficult to duplicate (e.g., "clone") its function in another device. For instance, a circuit implementing the PRS generates the values in a manner that depends on fabrication characteristics that vary among instances of the circuit, for example, among instances fabricated in the same manner or instances hosted in the same type of programmable gate array. In some examples, each pseudo-random value is represented as a two's complement number. That is, the j-bit output represents an integer in the range $-2^{j-1}, \ldots, +2^{j-1}-1$.

The R-PUF 100 effectively generates one or more random numbers, $R_i$, which depends on the challenge input and on the output of the PRS 110. In the embodiment shown in FIG. 1, a recombiner 120 accepts the challenge and the output of the PRS to determine the outputs of the R-PUF 100. When the same challenge is provided to the R-PUF at different time, the random numbers re-generated by the R-PUF, although not necessary identical, are similar or highly statistically related. That is, the R-PUF output can be considered or analytically or statistically modeled as a "noisy" observation of an underlying randomly drawn but fixed value. For example, if in one application of the R-PUF the output value is very positive (e.g., R=+5 for a k=4 case), then on a subsequent application, the output value would be expected to again be +5, or a positive value close to +5, as compared to a negative value, for example −5.

In examples in which the recombiner and the PRS are implemented in the same device, one or more outputs of an R-RUF may be used to authenticate a device in which the PRS is implemented, to encrypt information passed to or from the device, or perform security functions that benefit from the unclonable and/or unpredictable nature of the R-PUF. In examples where recombiner and PRS are physically distinct, one or more outputs of an R-RUF may be used to authenticate a particular instance of PRS external to device containing recombiner, or to generate keys associated with PRS being joined to device containing recombiner; a R-PUF is logically formed when the recombiner is joined with in instance of PRS external to device containing recombiner.

Figure 2:
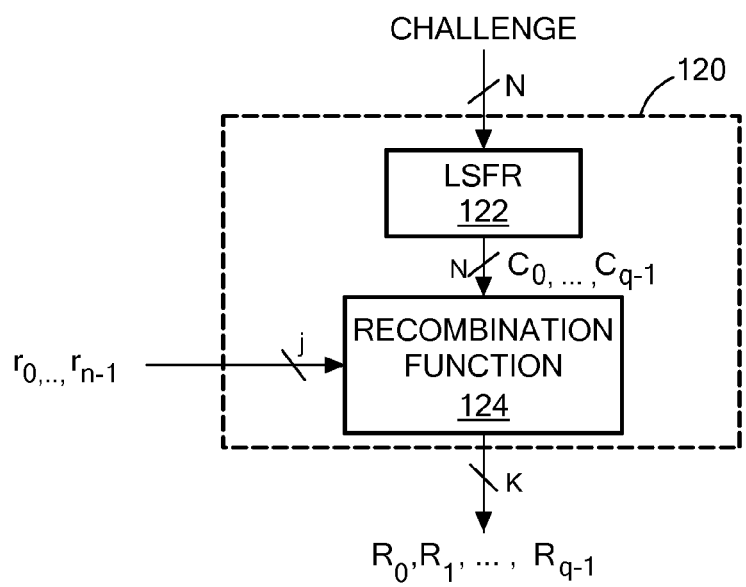
FIG. 2 is a block diagram of a recombiner element of an R-PUF.

Referring to FIG. 2, in some examples, the recombiner 120 accepts a single initial challenge, and makes use of a linear feedback shift register (LFSR) 122 to generate a series of instantaneous challenges, $c_i$. Each challenge is applied to a recombination function element 124, which uses the PRS outputs to generate a corresponding output, $R_i$. In some examples, entire PRS output $r_0, \ldots, r_{n-1}$ is used repeatedly to generate different $R_i$ bits, which each $R_i$ bit being derived from a different instantaneous challenge, the same recombination function, and the same or similar (e.g., possibly generated with noise) $r_0, \ldots, r_{n-1}$ PRS output values. That is, the entire PRS output $r_0, \ldots, r_{n-1}$ is treated as a single "region", and the recombination function 124 operates on entire PRS output to generate each $R_i$. In some examples, the PRS output is divided into multiple (possibly overlapping) regions, with each $R_i$ being derived from one or more regions (instead of all regions), with the region being used based on a fixed schedule or selected via bits in the instantaneous challenge value, and with possibly different recombination function assigned to each region or a group of regions, with the mapping between recombination function and region determined by a fixed schedule or possibly by bits in the instantaneous challenge value. In some examples, results from each of multiple regions are treated as intermediate results and are further processed, for example via another round of recombination with possibly a different recombination function, to derive the final $R_i$ values. In some cases, certain values $R_i$ may effectively ignore parts of PRS output by effectively multiplying certain of the values by zero depending on, for example, instantaneous challenge values or a fixed schedule, or performing other operations that are logically equivalent, for example, via multiplexing.

In some embodiments, each PRS output represents a probability (which may be referred to as a "soft bit") of the sign of an underlying quantity upon repeated generation. For example, if the relative delay of two delay lines are very different, the output will be (as an example) close to $2^{j-1}-1$ or close to $-2^{j-1}$, and if the two delay lines are very similar, then the output will be close to 0.

In some embodiments, the PRS itself may be challengeable. Since the recombiner expects the pseudo-random sequence $r_0, \ldots, r_{n-1}$ to be reproduced whenever a particular instantaneous challenge applied to recombiner, the PRS challenge may be fixed (i.e., the same for all challenge inputs to the R-PUF) or may be dependent on the R-PUF challenge input.

Figure 3:
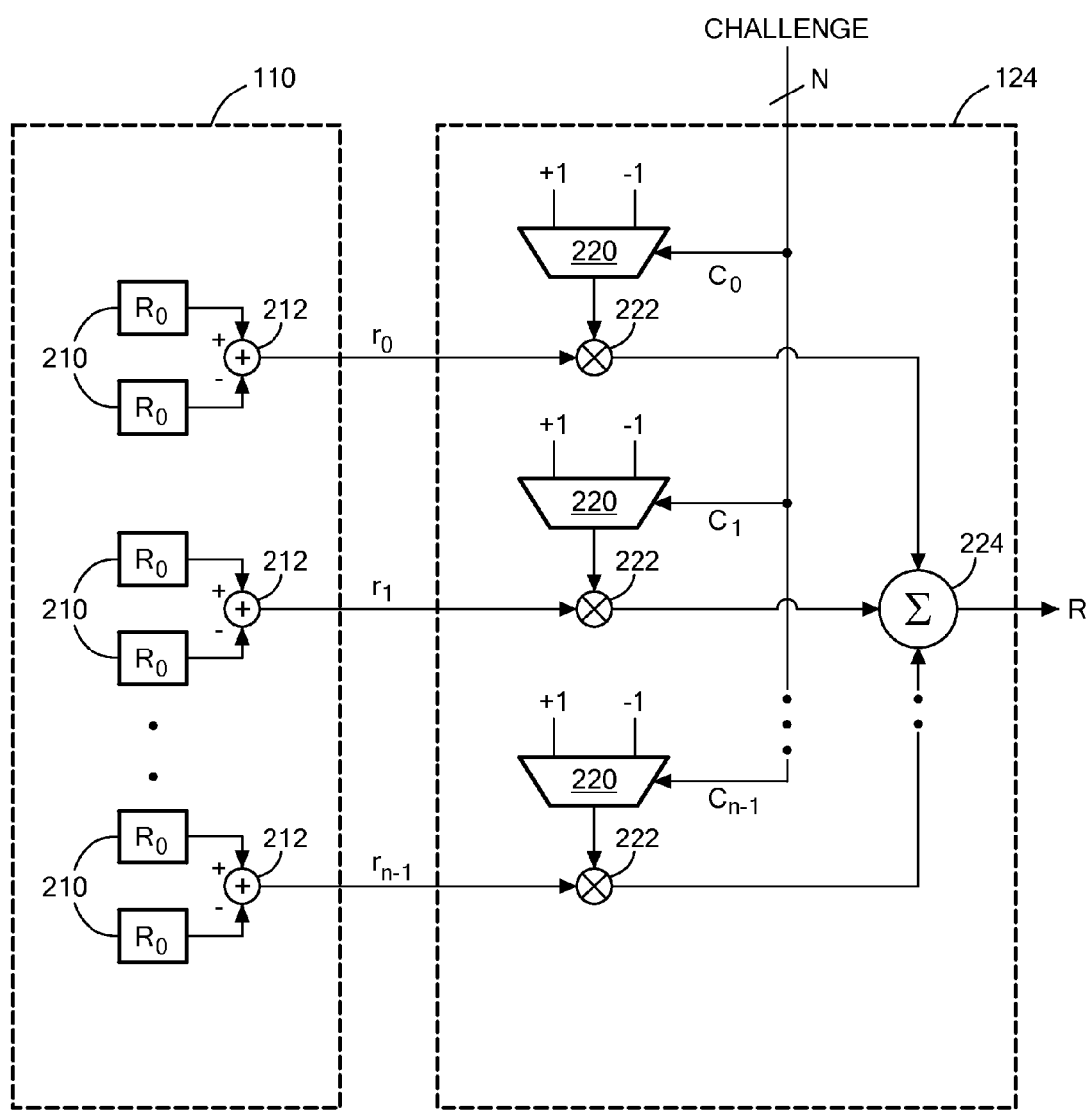
FIG. 3 is a block diagram of an example of an oscillator-based R-PUF.

Referring to FIG. 3, in one example of an R-PUF, the PRS 110 includes a set of oscillators 210 that have oscillation frequencies that each depends on specific characteristics that vary among the oscillators 210 on a device, and vary among oscillators fabricated in different devices. In some examples, the oscillators 210 are formed as ring oscillators (RO) whose oscillation frequencies depend of signal delay in a feedback path in the oscillator. A count of the number of oscillation periods in a fixed time interval determines a pseudo-random number associated with the oscillator. The determined pseudo-random numbers associated with each pair of oscillators 210 are passed through a differencing unit 212, outputting one of the set of PRS outputs, $r_i$. In this example, the total number of PRS outputs is N, equal to the number of bits in the challenge, and a single recombination output, R, is determined from the PRS outputs.

In this example, the recombination function element 124 accepts the N-bit challenge input, which controls a series inputs to multipliers 222, to multiply each corresponding PRS input by either +1 or −1 selected using a multiplexor 220 according to the value of a corresponding bit of the input challenge. In some alternative implementations, this multiplication is implemented with bit-wise inverters and multiplexors as an optimization, instead of using an explicit multiplier and a multiplexor to one of the multiplier input, or using various other transformations or optimizations. The outputs of the multipliers 222 are passed to a summer 224 which accumulates the multiplied PRS values to generate the signed multi-bit (e.g., 2's complement) value R, which represents both a polarity and magnitude/confidence information. In applications where confidence information is not required, just the "hard" bits (bit polarity) is outputted as a single-bit value. A specific example of the arrangement shown in FIG. 3 has 32 oscillators in the PRS 110, and 16 PRS outputs. The challenge input has 16 bits with each bit being used to control the input to a corresponding multiplier 222. Note that in this example, as long as the expected value for each post-multiplied oscillator frequency difference is unbiased for an ensemble of these outputs, the output R of the R-PUF is unbiased. This can be achieved, for example, by generating challenge inputs using a well-mixed polynomial for LFSR to derive a challenge schedule. In some designed system, a statistically unbiased output R is achieved by construction, without appreciable increase in self-noise, with sequence of bits derived from polarity of R in some examples passing NIST's statistical tests for randomness. In some designed system, outputs R exhibit better error characteristics than the PRS outputs $r_0, \ldots, r_{n-1}$ since noisy $r_0, \ldots, r_{n-1}$ in some examples contributes less to R than strong $r_0, \ldots, r_{n-1}$. In these designs, the recombination function effectively serves as an error reduction mechanism, even prior to formal error correction (if present). In these designs, error correction, if required, has reduced complexity; for authentication applications without error correction, type I/type II error characteristics is improved.

Figure 4A:
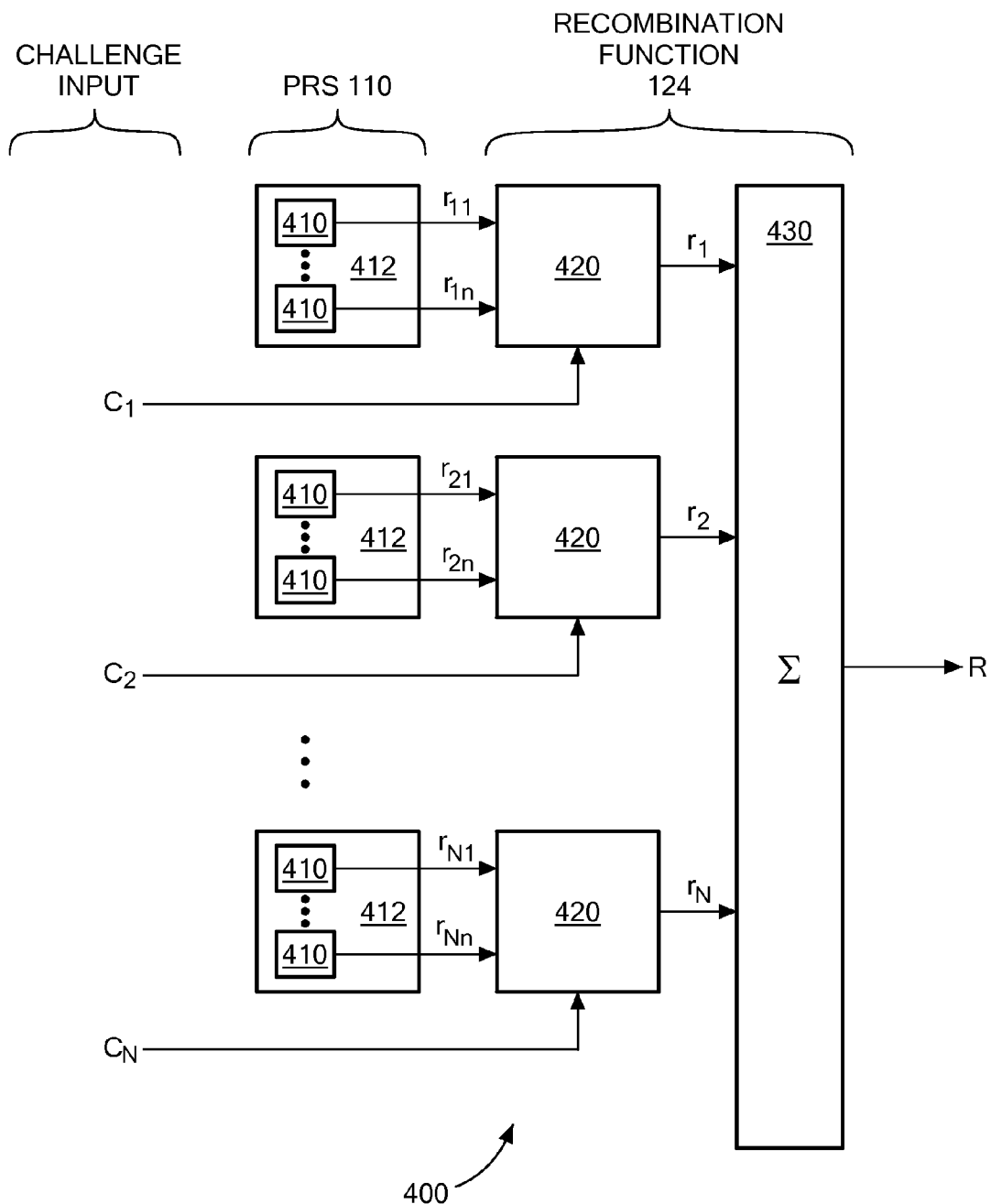
FIGS. 4A and 4B are a block diagram of an example of an R-PUF.
Figure 4B:
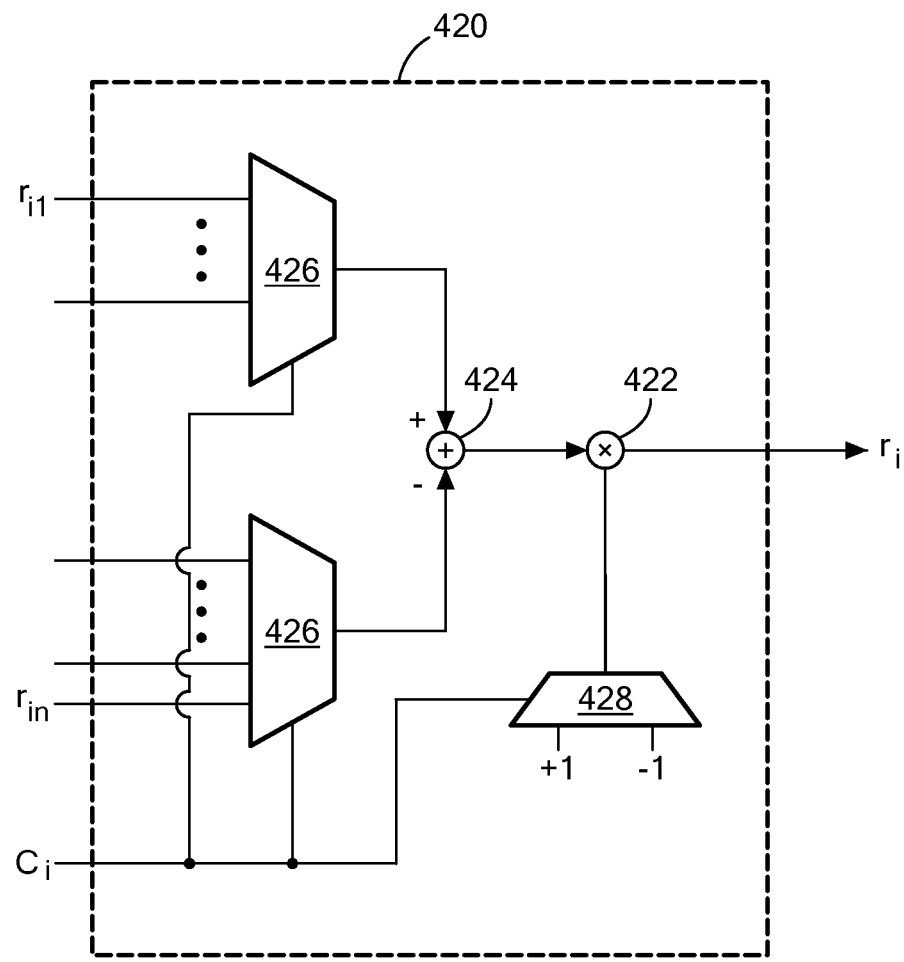

Referring to FIG. 4A, in an example of an R-PUF, the challenge input is used to determine a combination, such as an additive combination, of the outputs of N stages, with each stage having a combination block 420 as shown in FIG. 4B. This example of an R-PUF 400 accepts an N-bit challenge consists of challenge made up of groups of bits $c_1, \ldots, c_N$, for instance with each group having 7 bits. The PRS 110 has N pools 412 of oscillators 410. For each pool 412, the corresponding challenge bits configure a combination block 420.

Referring to FIG. 4B, the example of the combination block 420 determines which two quantities from the corresponding pool 410 are to be selected using selectors 426 and combined (i.e., subtracted in a subtractor 424 and then inverted according to a bit of the portion of the challenge for that pool using a multiplier 422 and a +1/−1 selector 428). The outputs of the combination blocks 420 pass to an overall combination block 430, which combines the N values, in this example, by arithmetic summation.

The example of a combination block 420 effectively computes a difference of the two input values according to the corresponding challenge bits. Specifically, the combination block 420 provides an output $$r_i = \begin{cases} r_{ix} - r_{iy} & \text{if } p = 0 \\ r_{iy} - r_{ix} & \text{if } p = 1 \end{cases}$$

where the challenge bits $c_i$ represent the tuple (x, y, p), where the values x and y control the selectors 426 and the value p controls the selector 428. Note that to the extent that the input values have the same expected value, the output of the combination block is unbiased. The outputs of each of the combination blocks 430 are then summed in the overall combination block 430 to form the overall output $$R = \sum_{i=1}^{N} r_i.$$

In alternative embodiments, rather than using device-specific circuit characteristics, such as characteristics of oscillators, the PRS output quantities that are recombined according to a challenge are based on other types of internal or external measurements of underlying physical characteristics.

The underlying physical characteristics may be, for instance, biometric or manufactured characteristics of a user or device that is to be authenticated. An example of manufacturing characteristics (e.g., a paint speckle pattern) on a casing of telecommunications equipment with a rough surface that is produced as a result of manufacturing process.

Figure 5A:
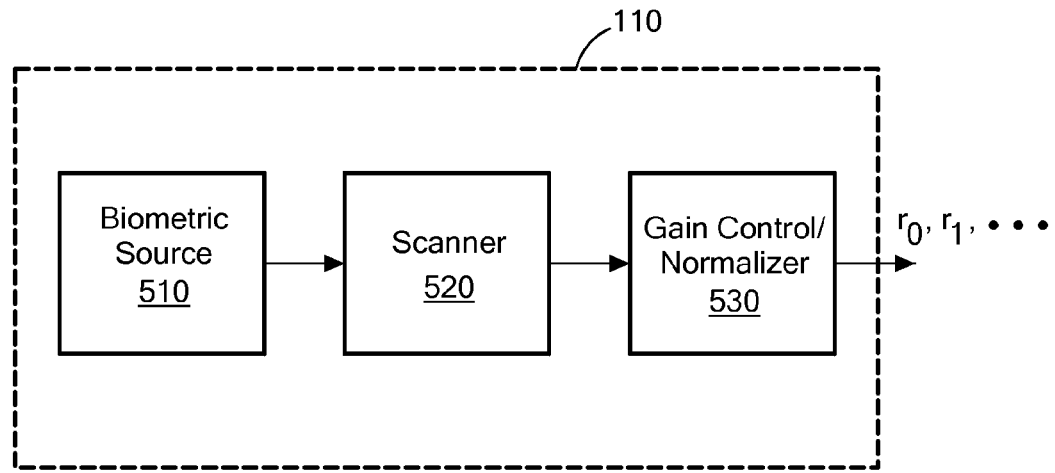
FIGS. 5A and 5B are a block diagram of an example of a scanner-based R-PUF.

Referring to FIG. 5A, in an example of a PRS 110 based on underlying physical characteristics, a scanner 520 includes a sensor for reading a biometric (e.g., fingerprint, retinal pattern) or manufactured characteristics source 510. For example, real-valued readings are obtained, for example, based on height of different features on the rough manufactured surface, which are presumed to remain the same due to tear and wear, due to the strength of underlying manufacturing material.

An example of such a scanner 520 is able to locate a reference location (inherent in manufacturing of material) to align the scan, and post process as necessary before outputting. A gain control and/or normalizer stage 530 processes the output of the scanner 520. For example, bias associated with surface height being above or below certain level is de-baised (perhaps on a scan region by scan region basis) using AC coupling (e.g., DC removal circuit, possibly a capacitor if incoming signal is analog). Next, each scan region is normalized in power using a form of automatic gain control circuitry (e.g., RMS detector with feedback). The resulting output values $r_0, r_1, \ldots$ are stored in buffer (associated with a scan region) contains values that has an expected value of zero (due to DC removal), and have total absolute area (e.g., value roughly proportional absolute value of amplitudes summed, or an rms value) that is fairly stable from one buffer to next. The PRS outputs in FIG. 5A are then passed to an implementation of a recombiner 120, shown in FIG. 5B, which produces the output(s) of the R-PUF based on a challenge input.

Figure 5B:
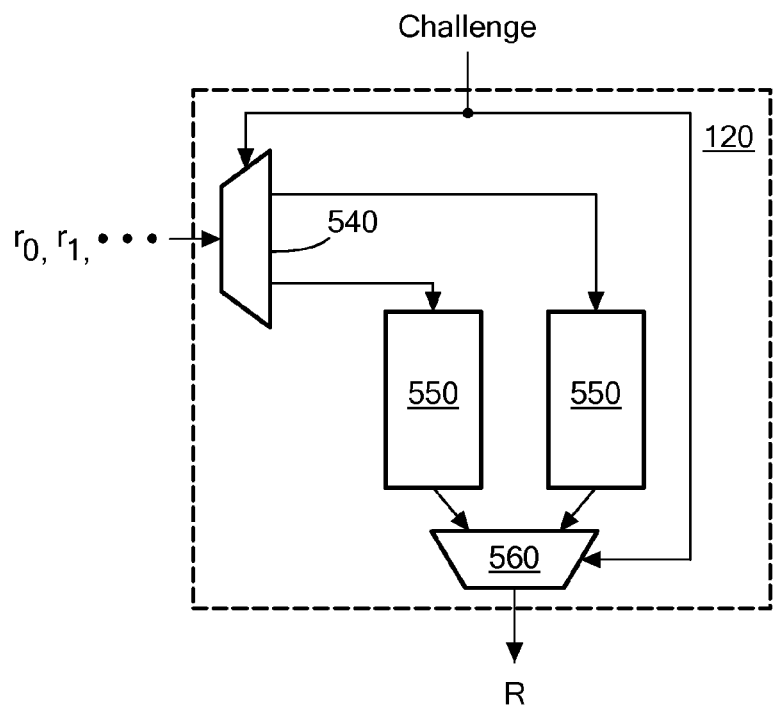

Referring to FIG. 5B, in the exemplary implementation of the recombiner 120, the PRS values are passed through a demultiplexor 540 according to challenge input bits into one of two accumulators 550. By construction, the sum of the two accumulators should be zero. With a well-mixed challenge, contents of either accumulators are expected to be fairly unbiased. After accumulation is complete (for example, after entire biometric source is demultiplexed), elements of one of two accumulators are chosen to determined the R-PUF outputs, with the multiplexor 560 select being based on challenge. Variants include concatenating both results and outputting both consecutively, or have ordering of output pairs be dependent on challenge, or outputting XOR of polarity of both results in addition to confidence for both, and allow downstream logic to filter out noisy results based on confidence information. Other variants include use of multiple accumulators, or weighted accumulators, with weights determined possibly from challenge or from power detector or both. A well chosen mixing function/demultiplexing function can also be used to complicate modeling attacks. Variants include a demultiplexor that throws away some bits depending on challenge, and challenge that scales demultiplexed bits, where scaling factors are zero biased, or challenge values are mixed with incoming signal before dc removal, or after dc removal but before gain control.

In some examples, the recombination function uses a despreader that takes, for example, an orthogonal code as input, to produce multi-dimensional orthogonal outputs from a single PRS source or multiple PRS sources. In some examples, multiple outputs are generated that are not necessarily orthogonal by construction, possibly by applying multiple recombination function to a single PRS source, or multiple PRS sources.

In some examples, the recombination function consists of a serial to parallel converter, a bias extractor, a Hamming to Euclidean converter, all followed by a DC removal circuit. A bit serial output from PRS is thus recombined to have real-valued output, with output based on device unique statistics (DC bias in this case) of PRS when PRS is subject to different challenge values.

In various embodiments, the output of PRS can be a discrete time quantized signal (e.g., a fully digital value, for example, in two's complement representation per sample), can be a discrete time analog signal (e.g., analog signal for each sample), or can be a continuous time non-quantized (full analog) signal, or combinations of these (for a multi-modal example where multiple PRS are conceptually multiplexed into a single PRS entity). The recombiner can be fully digital (receiving fully digital input), or can be an analog recombiner (e.g., using switched capacitor circuits), or can contain an A/D and perform subsequent recombination in a fully digital fashion, or can use other hybrid mixed signal techniques, or combinations of these. Similarly, PRS, can natively have fully digital output, or can have an integrated A/D to output fully digital outputs, or combinations of these. In some systems, a sensor is present and that can reside with the recombiner or PRS or in a path in between, or combinations of these.

In some examples, the PRS generates its output values according to a random seed value, which may be independent of the challenge (e.g., may be a fixed seed). In some such examples, the random seed value may be set according to the challenge input, for example, based on a portion of the challenge, or as a function of the challenge.

As introduced above, in various embodiments, the PRS and the recombiner are either integrated in one device, or are fully or partially separate (e.g., physically distinct). An example of a partially separate implementation includes an implementation in which a sensor of an external source is integrated with the recombiner, but the source itself is external to the device.

In some examples, the recombiner is coupled to a reader, sensor or similar device, for instance in a same device or housing, and is used to collect readings or measurements that are derived from one or more of biometric readings (e.g., human fingerprint, retinal scan pattern, DNA reading, etc.), measurements of physical characteristics such as paint splotch patterns, speckle patterns, optical or magnetic readings, piece of paper or fabric, device-specific signatures from an integrated circuit, where recombination module is not physically co-located with PRS. Logically, a R-PUF is still formed when the recombiner is joined with a particular PRS instance.

In systems where one or more sensors are used, the sensor can exist at number of different points in the path between the biometric or manufactured source and the recombiner, while logically still implementing an R-PUF. For instance, the sensors can exist within device but separate from the recombiner, within device and integrated with the recombiner, integrated with PRS, or outside device and outside PRS, etc.

In some examples, the recombiner can be used with multiple different PRS. For instance, there may be one internal and one external PRS. More generally, examples include multiple external PRS, multiple internal PRS, or combinations thereof. The multiple PRS can be conceptually multiplexed into a single PRS, or selected according to criteria such as challenge inputs, for processing by a recombiner as outlined above.

In some examples, the pseudo-random source 110 and/or the recombiner 120 are implemented in circuitry, for instance, in special purpose circuitry on an integrated circuit. In some examples, the recombiner is implemented using a processor that implements the recombination using an instruction processor that performs arithmetic recombination of the PRS values. In some examples, the PRS provides analog values rather than digital values. In some examples, the recombiner operates directly on analog values, for example, in a charge-transfer clocked analog circuit.

In some examples, the pool of sources of the pseudo-random numbers includes distinct groups, each associated with a stage controlled by a different part of the challenge. In other examples, the groups may overlap such that different stages may have the opportunity to select from common elements.

In some examples, the PRS 110 includes a measurement module, for example, to make measurements of physical measurements. The measurements may be based on device characteristics, such as paint splotches or light speckle patterns, or biometric features, such as fingerprint or iris scans of a subject.

In some examples, the $R_i$ generated above are further themselves recombined by tandem application of recombiner modules (possibly multiple times) to form the final $R_i$, using operations that include mathematical and logical operations.

In some examples, the outputs of the R-PUF as determined in sequence, while in other examples, they are determined in parallel.

In some examples, implementations of the R-PUF in FIG. 3, in addition to de-biasing PUF output, is also a fully-challengeable real-valued PUF supporting both of the following features:
  a large challenge space (e.g., 32 or 64 bits yielding $2^{32}$ or $2^{64}$ possible challenge values or combination configurations), suitable for authentication based on challenge/response pairs; and
  real-valued outputs suitable for soft decision error correction, to increase environmental stability and reduce complexity for key generation. (The MSB of R in FIG. 3 indicates a bit polarity of 1 or 0, and the remaining bits of R indicate strength of that bit.)

Arbiter PUFs with multiple arbiters and output processing) may have a large challenge space but natively do not necessarily produce real-valued outputs of sufficient resolution (e.g., at least 4 bits) for many applications, thus potentially complicating error correction. Oscillator PUFs and memory PUF may not have a sufficiently large challenge space. However, when applied to the oscillator PUF, recombination results in a PUF with a large challenge space which was not present in the original oscillator PUF.

Note that model-building (e.g., using machine learning) to build a software clone within reasonable time may be possible for PUFs using simple recombination functions. If resistance against model-building attacks is required, a more complex recombination function is preferably used.

In some embodiments, to support key generation, the following components are added to the recombined PUF of FIG. 3:
  Index-Based Syndrome Encoder (supporting 0th to 5th order indices) as described in U.S. application Ser. No. 12/850,693, "Index Based Coding with a Pseudo Random Source," filed on Aug. 5, 2010, which is incorporated herein by reference;
  1×, 3×, and 5× repetition coder and majority decoder; and BCH(63) codec supporting t=1 to 6.

Index Based Syndrome Coding, taking advantage of recombined real-valued outputs, can achieve a 16× to 64× reduction in error correction code complexity through use of soft decision coding.

Figure 6A:
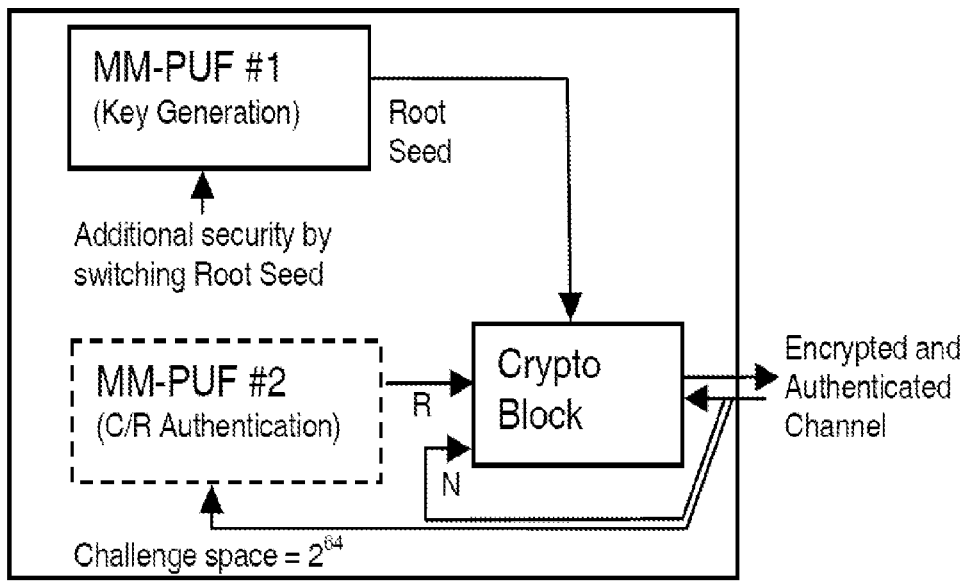
FIGS. 6A and 6B are a multi-mode PUF design.

Referring to FIG. 6A, in some implementation, a multi-mode PUF approach is uses. The design is multi-modal in that it can operate in both challenge-response (C/R) authentication mode (due to large challenge space achieved using recombination) and in key generation mode (recombined real-valued outputs results in stable and efficient error correction). To provide flexible multi-modal operation, this design supports multiple oscillator banks and a variety of recombination functions, including the one shown in FIG. 3 as well as 2/4/8 way XORs, multi-LFSR mixing, and other features.

Figure 6B:
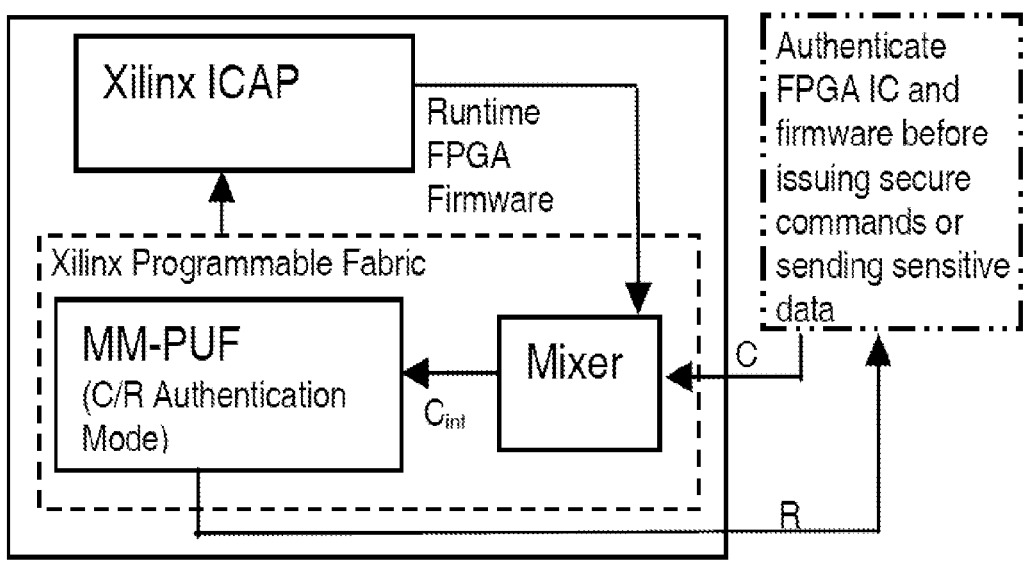

An illustrative use case for Multi-mode PUF is shown in FIG. 6B, where PUF #1 is used in key generation mode and PUF #2 is used in C/R authentication mode; this is to provide a layered security approach that is stronger than conventional approaches of using only burn-in keys. PUF #1, by using different challenges, generates multiple root seeds; this is costly with conventional approaches. Conventional approaches also rely on security by physical obscurity and are broken if design is physically de-layered and visualized. A PUF is immune to such an attack, since all devices have the same layout and yet produce different keys. The device can be authenticated by an entity that knows the root seed (or a key derived from root seed) by sending a random nonce N as shown in the figure, which is encrypted on the device and can be decrypted on the client side. Optionally, a second multi-mode PUF operating in C/R authentication mode (PUF #2) can be added. PUF #2 offers an extra measure of security by relying on C/R authentication where C/R pairs are used only once and discarded. The response of PUF #2 is encrypted using the root seed or derived key and decrypted on the client side.

Implementations of the approaches described above can make use of hardware, software, or a combination of hardware and software. Hardware can include Application Specific Integrated Circuits (ASICs), Field Programmable Gate Arrays (FPGAs), or other specific or configurable circuitry. Software can include instructions stored on a computer readable medium (e.g., in a semiconductor memory) for causing a processors (e.g., a controller, generally purpose CPU, etc.) to perform certain of the functions described above, for instance in conjunction with functions implemented in hardware. In some implementations functions are distributed among a number of devices (e.g., integrated circuits, computers, etc.) while in other implementations, the functions are hosted within one device, for instance, making it difficult or impossible for an adversary to gain access to internal volatile values generated during operation. In some examples, the functionality is embedded into special purpose devices, such as Radio Frequency IDentification devices (RFIDs), FPGAs, or secure processors.

It is to be understood that the foregoing description is intended to illustrate and not to limit the scope of the inven-

What is claimed is:

1. A device comprising:
an input for accepting a challenge value;
a pseudo-random source, comprising circuitry for generating one or more device-specific quantities, each quantity depending on device-specific characteristics that vary among like devices formed according to a common design, each of the device-specific quantities representing a degree of comparison of devices-specific characteristics, wherein the circuitry for generating the device-specific quantities includes an output for passing each device-specific quantity as a digital value having a multiple bit representation;
circuitry configured to combine the generated device-specific quantities according to a challenge input;
a recombination module coupled to the input for accepting the challenge and coupled to the pseudo-random source, the recombination module being configurable according to the challenge value to combine values received from the pseudo-random source according to a combination function dependent on the challenge value to form a combined pseudo-random value; and
an output for providing the combined pseudo-random value.

2. The device of claim 1 further comprising at least one of: (1) an authentication component responsive to the combined value, (2) a cryptographic component responsive to the combined value for generating a secret value, and (3) an error correction module for determining and/or using error correction data for the combined value.

3. The device of claim 1 wherein the challenge value comprises an N-bit value, where $N \geq 32$, and the recombination module is configurable in at least $2^N$ configurations.

4. The device of claim 1 further comprising the pseudo-random source, said source being coupled to the recombination module.

5. The device of claim 4 wherein the pseudo-random source is configured to provide a plurality of values, each value comprising a multiple-bit representation of a measurable physical characteristics.

6. The device of claim 4 wherein the pseudo random source provides values according to a seed value.

7. The device of claim 6 wherein the seed value comprises a fixed seed value.

8. The device of claim 1 further comprising an input for accepting values determined from the pseudo-random source, said input being coupled to the recombination module.

9. The device of claim 8 wherein the input for accepting values determined from the pseudo-random source comprises a sensor for determining measurements of physical characteristics associated with the source.

10. The device of claim 9 wherein the physical characteristics comprise at least one of manufacturing characteristics and biometric characteristics.

11. The device of claim 1 wherein the pseudo-random source comprises multiple separate pseudo-random sources, at least one of the separate sources being external to the device.

12. The device of claim 1 wherein the recombination module is configured to form successive recombined values, each recombined value being formed from a recombination function and a different instantaneous challenge determined from the challenge input.

13. The device of claim 12 further comprising a sequence generator for accepting the challenge input and deterministically generating a sequence of instantaneous challenge values.

14. The device of claim 13 wherein the sequence generator comprises a linear feedback shift register.

15. The device of claim 1 wherein the degree of comparison includes a polarity and magnitude.

16. The device of claim 1 wherein the challenge input selects different combination functions.

17. The device of claim 1 wherein the challenge input selects a region of the device-specific characteristics.

18. The device of claim 1 wherein the challenge input is used to affect weighting of the device specific values.

19. The device of claim 18 wherein the weighting of values comprise weights by values in a set of +1, −1 and 0.

20. The device of claim 1 wherein the circuitry to combine the challenge input and the device-specific values forms a non-linear combination of the challenge and device specific values.

21. The device of claim 1 wherein the circuitry to combine the challenge and the device-specific values includes circuitry to form a linear function of the device-specific values, the linear function being configured according to the challenge input.

* * * * *